Oct. 26, 1954          G. E. MILLIGAN          2,692,443
GEAR TRAIN DEMONSTRATING EDUCATIONAL DEVICE
Filed Dec. 22, 1950          2 Sheets-Sheet 1
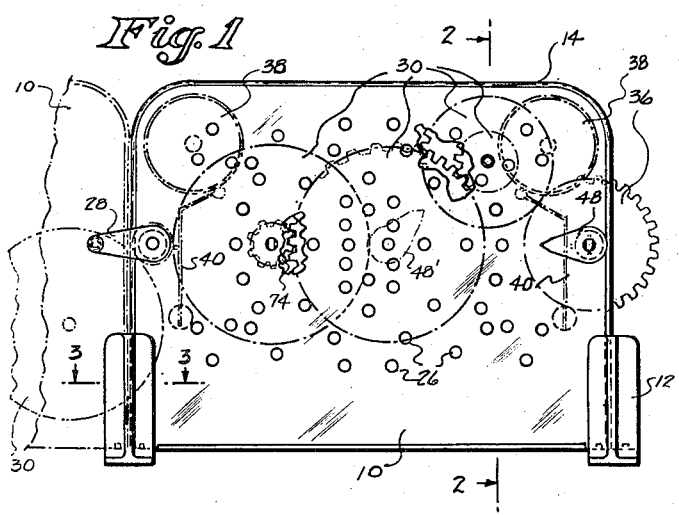
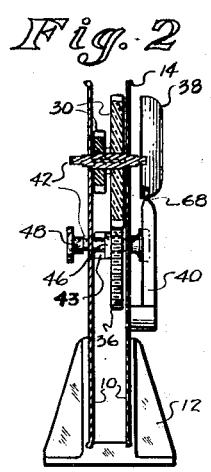
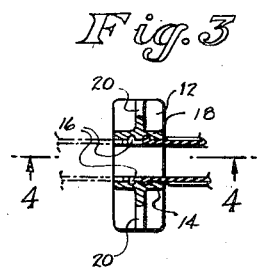
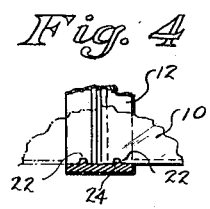
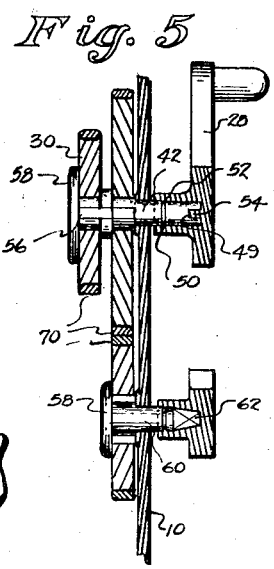
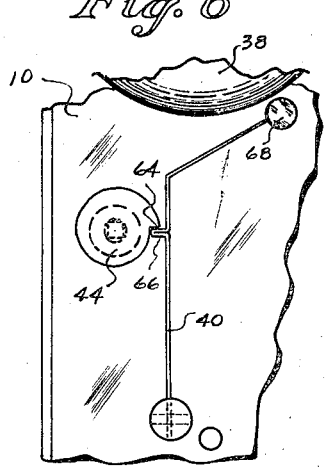
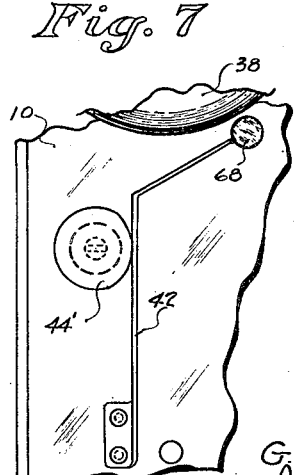
INVENTOR.
G. E. Milligan
BY James F. Weiler
ATTORNEY Oct. 26, 1954 G. E. MILLIGAN 2,692,443
GEAR TRAIN DEMONSTRATING EDUCATIONAL DEVICE
Filed Dec. 22, 1950 2 Sheets-Sheet 2

INVENTOR.
G. E. Milligan
BY James F. Wieler
ATTORNEY

Patented Oct. 26, 1954

2,692,443

UNITED STATES PATENT OFFICE 2,692,443

GEAR TRAIN DEMONSTRATING EDUCATIONAL DEVICE

Gaymond E. Milligan, Houston, Tex.

Application December 22, 1950, Serial No. 202,269

5 Claims. (Cl. 35—13)

This invention relates to educational devices and more particularly relates to such devices which teach the laws of rotation and gear trains.

An object of my invention is to provide an educational device by which the laws of rotation and gear trains are illustrated.

A further object of my invention is the provision of a device in which varying gear elements may be removed or inserted from or into the gear train to change the gear ratio thereof and in which the change of gear ratio is indicated.

A still further object of my invention is the provision of a device of the character described which is attractive in appearance and which may be manufactured economically.

A feature of my invention is the provision of a device of the character described in which several of such devices may be secured together whereby a wide variety of gear ratios may be obtained and relatively long and complicated gear trains may be provided and illustrated.

Figure 8:
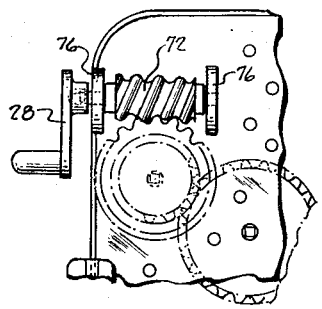
Figure 9:
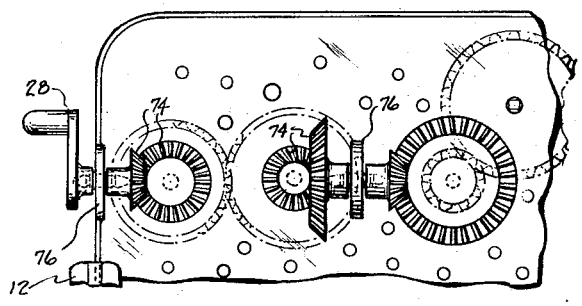
Figure 10:
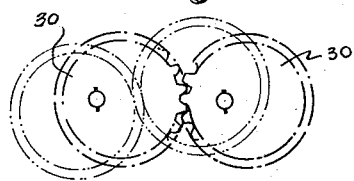
Figure 11:
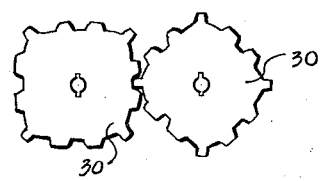
Figure 12:
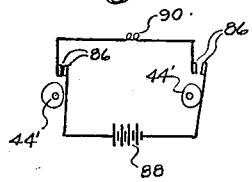
Figure 13:
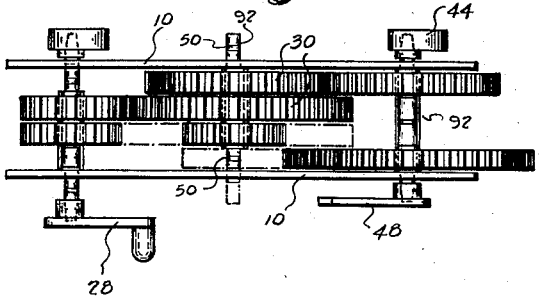
Figure 14:
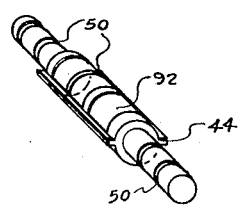

Other and further objects and features will be apparent from the following descriptions of a typical embodiment of my invention taken in connection with the accompanying drawing, in which like character references designate like parts throughout the several views, and in which Fig. 1 is a front elevation, with parts broken away, showing a device illustrating principles of my invention, Fig. 2 is a sectional view taken along the line 2—2 of Fig. 1, Fig. 3 is a sectional elevation of a supporting standard illustrated in Fig. 1, Fig. 4 is a fragmentary section taken along the line 4—4 of Fig. 3, Fig. 5 is a sectional elevation illustrating a means of securing the crank and cam mechanism, Figs. 6 and 7 are fragmentary enlarged front elevations illustrating typical cam assemblies to actuate the indicating means, Fig. 8 is a fragmentary front elevation illustrating an alternative type of gear drive, Fig. 9 is a fragmentary front elevation similar to Fig. 1, but illustrates a modified form of gear drive, Fig. 10 illustrates the use of eccentric gears or discs, Fig. 11 illustrates the use of odd shaped or square gears, Fig. 12 is a schematic wiring circuit illustrating an electrical embodiment of my indicating means, Fig. 13 is a plan view of a modified form of my invention in which gear ratios may be varied by simple adjustment of the component parts, and Fig. 14 illustrates a keyed shaft utilized in the embodiment of Fig. 13.

Referring to the drawings and particularly to Fig. 1, the reference numeral 10 designates substantially planer members or panels supported in an upright position by the standards 12. A pair of substantially parallel panels 10 are illustrated, which panels are preferably made of a material that is transparent, such as any suitable plastic.

In order that the panels 10 may have sufficient strength for the purpose and may be secured in an upright position, I have provided a peripheral bead 14 adapted to slidingly fit in the vertical grooves 16 of the upstanding flanges 18 of the standards 12. Re-enforcing ribs 20 diverge outwardly and downwardly from the top of the flanges 18 to the base of the standard 12 to provide the required strength for the standards.

In order that the panels 10 may be locked to the standards 12, I have provided the recesses 22 at each end of the lower side of the panels 10, the recesses 22 engaging the upstanding projections 24 disposed on the base of the standards 12. Thus by merely sliding the peripheral rim 14 of the panels 10 into the grooves 16 of the standards 12 until the projections 24 seat in the recesses 22, the panels 10 may be automatically locked in place.

In order that a gear train may be positioned in the panels 10, I have provided a series of aligned apertures 26 therein for the purpose of rotatably receiving shafts of the various elements of the train. These aligned apertures may form a variety of patterns by which a variety of gear trains may be positioned in the panels.

Referring now to Fig. 1, I have illustrated a train of gears indicated by the numeral 30. As illustrated, several gear elements may be secured to the same shaft to provide appropriate gear linkage. A crank 28 having a driving gear 34 secured thereto meshing with the first driven gear 30 drives the gear train, which in turn drives the driven gear 36 meshing with the last of the gear train 30. The crank 28 and the final driven gear 38 are secured to the panels 10 and, if desired, may not be adapted to be removed as are elements of the replaceable gear train representd by the numeral 30.

A pair of bells 36 are rigidly secured to the panel 10 and a pair of spring arms 40 having the hammers 68 are secured to the panels 10 and the hammers are adapted to strike the bells to give an indication of each revolution of the driving and driven gears, respectively. As best seen in Fig. 6, the spring arms 40 are engaged by the cam members 44 and as the crank 28 and driven gear 36 make a complete revolution, the bells 38 will be sounded. If desired, a pointer 48 (as seen in Fig. 1) may be secured to the final driven wheel 36 to indicate visually each complete revolution of the gear 36. Thus, as the crank 28 is rotated the particular gear train placed in the panels 10 will be actuated and will drive the final gear 36, the bell hammers 68 striking the bells 38 giving an indication of the gear ratio between the driving and driven gears. The pointer 48, of course, gives a visual indication of this ratio and may be connected to the shafts of each gear to give an indication of each revolution thereof, if desired.

Referring now to Fig. 2 it is seen that the shafts 42 which secure the various elements of the gear train and indicating means to the panels 10, have a splined or keyed portion 43 whereby the various elements of the gear train may be non-rotatably secured to the shafts 42. Circular flanges 46 are provided to separate the various elements of the gear train secured upon the shafts and the ends of the shaft 42 are keyed or splined in order that the bosses 48, or pointers or cam mechanisms and the like may be secured thereto.

Any type of rotatable shaft to which the gears or gear elements may be keyed or splined and which may be rotatably fixed to the panels 10 may be used. For example, in using a single panel, the type of shaft illustrated in Fig. 5 may be utilized. The shaft illustrated in Fig. 5 is identical with that of Fig. 2 except that the keyed end 49 of the shaft is provided with an annular or circumferential recess 50 disposed proximate one end. Thus, as an element of the gear train is secured to the shaft, here illustrated as the handle 28, an interfitting rim 52 is provided on the element and cooperating keys 54 interfit with the keys 49 thereby providing an automatic locking of the element to the shaft. In this connection, the elements may be made of plastics, which are slightly resilient and the elements may be snapped onto the shafts. In this shaft one end of the shaft is cut off and a pin member 56 is inserted into the shaft having the circumferential flange 58 which serves as a stop for the gear element 30.

With reference to Fig. 5, a different shaft is illustrated, such shaft being designated by the numeral 60 and this shaft is in all respects the same as the previous shafts, except it is shorter, has the flange member 58 integral therewith and has a splined end 62 instead of the keyed end 49.

Obviously a variety of means may be utilized to provide the necessary shafts to rotatably secure the gear elements to the panels 10. If desired, the shafts and gear elements may be integral.

Referring to a means by which the gear ratio may be indicated, the cam members 44 may assume any desired configuration. As illustrated in Fig. 6, I have provided the cam 44 with the offset 64 which cooperates with the bowed portion or follower 66 of the spring bell crank 40 having the hammer 68 disposed at its free extremity. The spring crank may be secured in any conventional manner to the panel. Thus as the cam 44 is rotated a complete revolution the hammer 68 will strike the bell 38, the bowed portion 66 following the cam 44. The cam arrangement illustrated in Fig. 7 may be used or any conventional cam arrangement may be utilized which is desired. In Fig. 7 the spring arm 42 follows the cam 44' thereby urging the hammer 68 sharply against the bell 38 for each revolution of the cam 44'. Thus as the crank 28 is rotated the bells 38 will be struck by the hammers 68 each time the cams 44 make a complete revolution; that is, each time the crank and driven gear 36 are rotated a full revolution. Thus, a sonic indication is given indicating the gear ratio. In addition, the indicator 48 may be secured to the shaft to which the gear 36 or any of the gears are secured, thereby giving a visual indication of the ratio of the gear train.

As indicated in Fig. 1, the gears may have the meshing teeth 74 or may be simple discs provided with a friction contact, such as a rubberized surface 70, as illustrated in Fig. 5. Moreover, as indicated in Fig. 8, worm gears 72 or bevel gears 74, as indicated in Fig. 9, may be utilized. In both these instances, suitable bosses 76 should be provided to which the gears and cranks are rotatably journaled.

As illustrated in Fig. 10, the gears may be eccentrically journaled to the panels; or, as illustrated in Fig. 11, the gears may be substantially square or odd shaped.

If desired, an electrical indicating means may be utilized to indicate the gear ratios. In Fig. 12 I have indicated the contacts 86 being opened and closed by the cams 44' whereby current flows from the source of electromotive power 88 to the indicating means, here indicated as a resistance 90.

A still further embodiment is illustrated in Fig. 13 in which the gears may be moved without removing them from the panels 10 and, accordingly, the gear ratio may be changed without removing the gear elements from the game. As illustrated, the gear elements 30 are keyed to the elongated shafts 92. As best shown in Fig. 14 the shafts 92 have a plurality of circumferential grooves 50 which snugly fit in the apertures 26 and to which the gears 30 snugly fit. The shaft 92 is so formed that the reduced ends of the shaft are elongated and have at least two circumferential grooves 50. Thus the shafts 92 may be moved a series of notches to move the gears to the position shown in the dotted lines thereby changing the gear ratio. In all other respects this embodiment is similar to the above described embodiments and no more description is deemed necessary.

Thus, while I have illustrated only three removable or changeable gear elements in Figs. 1 and 13 of the drawings, any desired combination may be utilized and, if desired, a similar unit may be secured in the standards 12 whereby the crank 28 will drive the gear train of the additional unit in the same manner as the unit illustrated herein. If desired, provision may be made for securing similar gear trains at the top or bottom of the device in the manner indicated. It is preferable that the gears and panels be made out of a transparent plastic and, if desired, the gears of different ratios may be colored differently to aid in visibly displaying the differences in the gear ratios. Moreover, if a single panel is utilized, it may be made of any suitable material, such as metal or wood. If desired, the shafts of the gear elements may be merely pegs or assume any desired form.

Thus, it is manifest that my invention may assume various forms and is capable of a variety of modifications. Accordingly, I do not intend to be limited to the precise details of the description given for the purpose of the disclosure, but only to the spirit of my invention and the scope of the appended claims.

I claim:
1. An educational game comprising body means, means in such body means to removably and rotatably receive gear elements of a gear train, gear elements removably and rotatably secured in a portion of such second mentioned means forming said gear train, the ratio of such gear train being variable by change or rearrangement of such gear elements, driving and driven gears adapted to drive and be driven by said gear train, and indicating means adapted to indicate the gear ratio between the driving and the driven gears, said indicating means comprising at least a pair of bells, bell cranks adapted to strike said bells, and cams secured to said driving and driven gears adapted to actuate said bell cranks.

2. An educational game comprising body means, means in the body means to removably and rotatably receive gear elements of a gear train, gear elements removably and rotatably secured in a portion of said second-mentioned means forming said gear train, the ratio of said gear train being variable by change or rearrangement of said gear elements, driving and driven gears on the body means adapted to drive and be driven, respectively, by said gear train, and indicating means adapted to indicate the gear ratio between the driving and the driven gears, said indicating means comprising an electrical indicator, an electric circuit, said electrical indicator being connected in the electric circuit, a pair of electrical contacts adjacent each of said driving and driven gears, each pair of contacts including stationary and movable contacts, an arm connected to each of said movable contacts, and cams secured to said driving and driven gears engaging and actuating said arms and thereby moving, on rotation of said driving and driven gears, said movable contacts into and out of engagement with said stationary contacts thereby opening and closing said electric circuit and thereby actuating said electrical indicator.

3. An educational game comprising body means, means in said body means to removably and rotatably receive gear elements of a gear train, gear elements removably and rotatably secured in a portion of said second-mentioned means forming said gear train, the ratio of said gear train being variable by change or rearrangement of said gear elements, driving and driven gears in said body means adapted to drive and be driven by said gear train, and indicating means on the body means for indicating the gear ratio between the driving and the driven gears, said indicating means comprising cams secured to said driving and driven gears, an arm secured to said body means and engaging and following one each of said cams, and an indicator actuated by movement of said arms.

4. An educational game comprising a supporting panel provided with a plurality of spaced apertures, gear elements removably and rotatably secured in a portion of said spaced apertures, said gear elements providing a gear train, the ratio of which is variable by change or rearrangement of said gear elements, driving and driven gears on the panel for driving and being driven by said gear train, and means to indicate the ratio between the driving and the driven gears, said means comprising cams secured to the driving and driven gears, a pair of arms secured to the panel and engaging and following one each of said cams, and at least one indicator on the panel actuated by movement of said arms.

5. An educational game comprising at least a pair of spaced panels, said panels provided with a plurality of aligned apertures, a plurality of gear elements detachably and rotatably secured in said apertures forming a gear train, the ratio of said gear train being variable by change or rearrangement of said gear elements, driving and driven gears secured to said panels driving and being driven by said gear train, and indicating means adapted to indicate the gear ratio between the driving and the driven gears, said indicating means comprising a cam secured to each driving and driven gear, followers secured to at least one of said panels engaging and following each cam, and indicator means secured to at least one of the panels, said indicator means being actuated by movement of said followers.

References Cited in the file of this patent

UNITED STATES PATENTS

| Number | Name | Date |
| --- | --- | --- |
| 1,105,396 | Behr | July 28, 1914 |
| 1,161,572 | Woodhull | Nov. 23, 1915 |
| 1,273,932 | Schlatter | July 30, 1918 |
| 1,417,048 | Farmer | May 23, 1922 |
| 2,095,046 | Wilner | Oct. 5, 1937 |
| 2,396,382 | Maibaum | Mar. 12, 1946 |
| 2,477,441 | Cole | July 26, 1949 |
| 2,490,783 | Cullen | Dec. 13, 1949 |